United States Patent
Lambert et al.

(10) Patent No.: US 11,604,745 B1
(45) Date of Patent: Mar. 14, 2023

(54) SELF-DESCRIBING IN-SITU DETERMINATION OF LINK PARAMETERS

(71) Applicant: Dell Products L.P., Round Rock, TX (US)

(72) Inventors: Timothy M. Lambert, Austin, TX (US); Bhyrav M. Mutnury, Austin, TX (US); Sandor Farkas, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/516,111

(22) Filed: Nov. 1, 2021

(51) Int. Cl.
 *G06F 13/20* (2006.01)
 *G06F 13/16* (2006.01)

(52) U.S. Cl.
 CPC .......... *G06F 13/20* (2013.01); *G06F 13/1689* (2013.01)

(58) Field of Classification Search
 None
 See application file for complete search history.

(56) References Cited

U.S. PATENT DOCUMENTS

| | | | | |
|---|---|---|---|---|
| 6,975,637 B1 * | 12/2005 | Lenell | ................. | H04L 49/351 370/395.5 |
| 7,757,936 B2 * | 7/2010 | Aguren | ............... | H04B 10/0775 235/375 |
| 8,115,631 B2 * | 2/2012 | Lange | ................. | H04Q 9/00 340/10.52 |
| 9,531,594 B2 * | 12/2016 | Venkatesan | ......... | H04L 41/0809 |
| 11,349,965 B1 | 5/2022 | Xu et al. | | |
| 2008/0265915 A1 * | 10/2008 | Clark | .................... | G01R 27/04 324/699 |
| 2012/0026922 A1 * | 2/2012 | Diab | .................... | H04L 1/0001 370/296 |

* cited by examiner

*Primary Examiner* — Elias Mamo
(74) *Attorney, Agent, or Firm* — Jackson Walker L.L.P.

(57) ABSTRACT

An information handling system may include a processor, a device communicatively coupled to a processor via a communications link including a cable assembly, and a management controller communicatively coupled to the processor and communicatively coupled to the device and the cable assembly via a sideband interface, and configured to: retrieve, via the sideband interface, self-describing signal integrity critical parameters from non-transitory computer-readable media integral to the device; retrieve, via the sideband interface, self-describing signal integrity critical parameters from non-transitory computer-readable media integral to the cable assembly; combine the self-describing signal integrity critical parameters from non-transitory computer-readable media integral to the device and the self-describing signal integrity critical parameters from non-transitory computer-readable media integral to the cable assembly into aggregate signal integrity critical parameters; and perform an action relevant to the communications link based on the aggregate signal integrity critical parameters.

21 Claims, 2 Drawing Sheets

SELF-DESCRIBING IN-SITU DETERMINATION OF LINK PARAMETERS

TECHNICAL FIELD

The present disclosure relates in general to information handling systems, and more particularly to methods and systems for self-describing in-situ determination of link parameters in an information handling system, including expected link health, self-tuning parameters, and speed limiting.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A major desire in information handling systems is configuration flexibility, through a myriad of backplanes, risers, and internal cables. With such configuration flexibility comes complexity in terms of determining parameters of a communications link that traverses multiple components, including link quality, signal integrity, maximum supported communications speeds, and/or other parameters.

SUMMARY

In accordance with the teachings of the present disclosure, the disadvantages and problems associated with determining parameters of a communications link in an information handling system may be reduced or eliminated.

In accordance with embodiments of the present disclosure, an information handling system may include a processor, a device communicatively coupled to a processor via a communications link including a cable assembly, and a management controller communicatively coupled to the processor and communicatively coupled to the device and the cable assembly via a sideband interface, and configured to: retrieve, via the sideband interface, self-describing signal integrity critical parameters from non-transitory computer-readable media integral to the device; retrieve, via the sideband interface, self-describing signal integrity critical parameters from non-transitory computer-readable media integral to the cable assembly; combine the self-describing signal integrity critical parameters from non-transitory computer-readable media integral to the device and the self-describing signal integrity critical parameters from non-transitory computer-readable media integral to the cable assembly into aggregate signal integrity critical parameters; and perform an action relevant to the communications link based on the aggregate signal integrity critical parameters.

In accordance with these and other embodiments of the present disclosure, a method may include, in an information handling system comprising a processor and a device communicatively coupled to a processor via a communications link including a cable assembly: retrieving, via a sideband interface, self-describing signal integrity critical parameters from non-transitory computer-readable media integral to the device; retrieving, via the sideband interface, self-describing signal integrity critical parameters from non-transitory computer-readable media integral to the cable assembly; combining the self-describing signal integrity critical parameters from non-transitory computer-readable media integral to the device and the self-describing signal integrity critical parameters from non-transitory computer-readable media integral to the cable assembly into aggregate signal integrity critical parameters; and performing an action relevant to the communications link based on the aggregate signal integrity critical parameters.

In accordance with these and other embodiments of the present disclosure, an article of manufacture may include a non-transitory computer-readable medium and computer-executable instructions carried on the computer-readable medium, the instructions readable by a processing device, the instructions, when read and executed, for causing the processing device to, in an information handling system comprising a processor and a device communicatively coupled to the processor via a communications link including a cable assembly: retrieve, via the sideband interface, self-describing signal integrity critical parameters from non-transitory computer-readable media integral to the device; retrieve, via the sideband interface, self-describing signal integrity critical parameters from non-transitory computer-readable media integral to the cable assembly; combine the self-describing signal integrity critical parameters from non-transitory computer-readable media integral to the device and the self-describing signal integrity critical parameters from non-transitory computer-readable media integral to the cable assembly into aggregate signal integrity critical parameters; and perform an action relevant to the communications link based on the aggregate signal integrity critical parameters.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
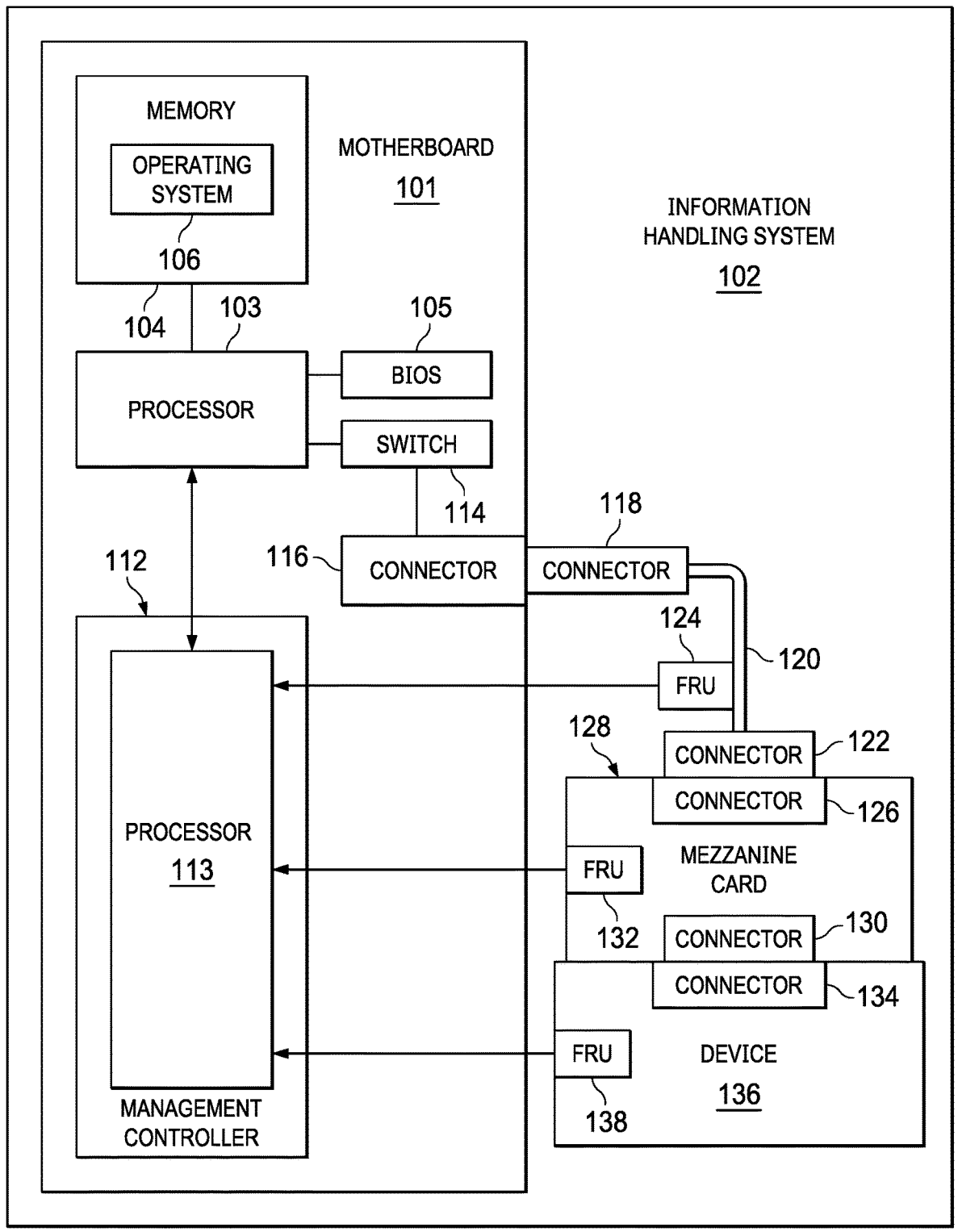
FIG. 1 illustrates a block diagram of an example information handling system, in accordance with embodiments of the present disclosure.
Figure 2:
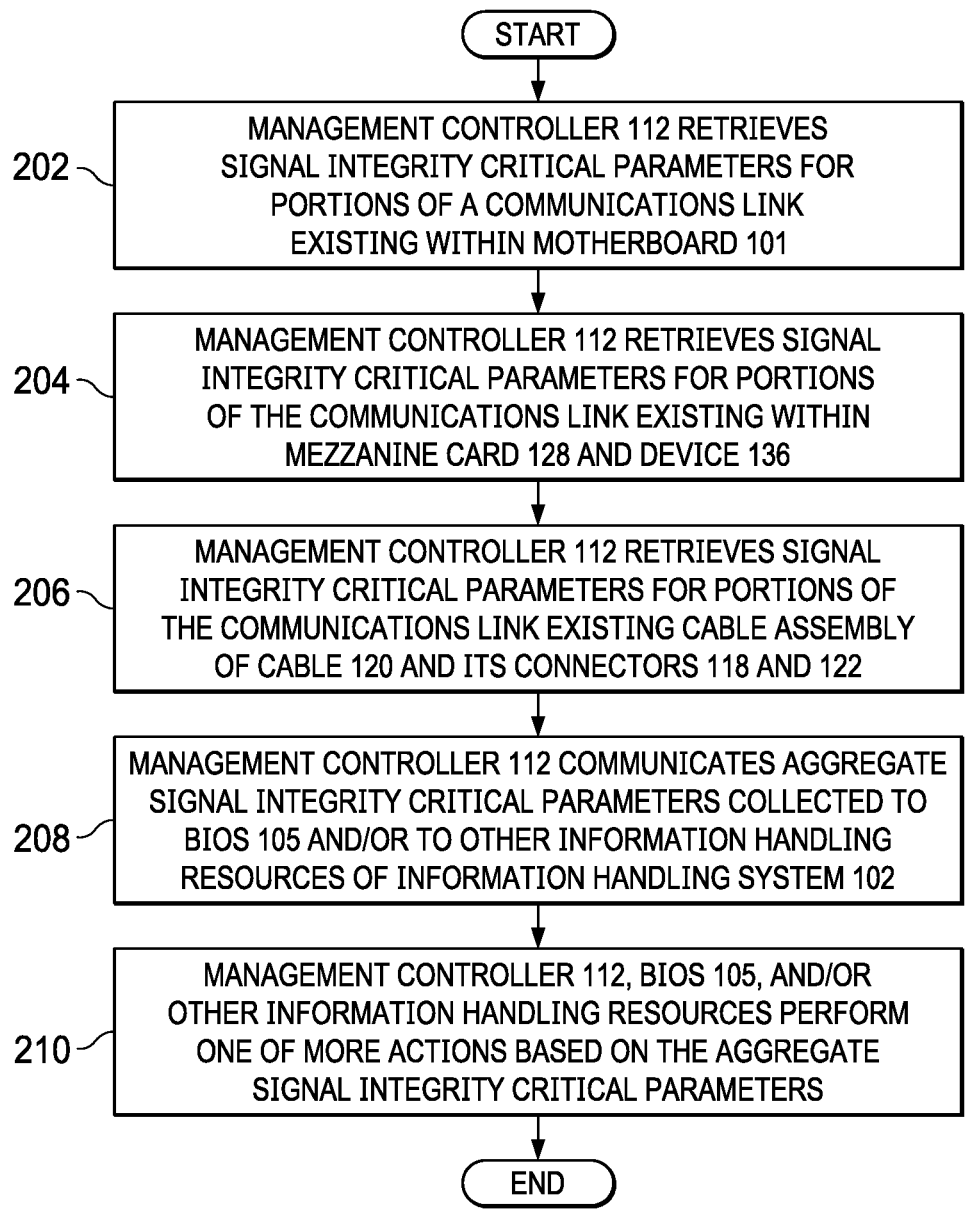
FIG. 2 illustrates a flow chart of an example method for determining parameters of a communications link in an information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.).

As shown in FIG. 1, information handling system 102 may include a motherboard 101, a cable assembly comprising a cable 120 and connectors 118 and 122 terminating cable 120, a mezzanine card 128, and a device 136.

Motherboard 101 may comprise a circuit board configured to provide structural support for one or more information handling resources of information handling system 102 and/or electrically couple one or more of such information handling resources to each other and/or to other electric or electronic components external to information handling system 102. Motherboard 101 may have mounted thereon a processor 103, a memory 104 communicatively coupled to processor 103, a basic input/output system (BIOS) 105 communicatively coupled to processor 103, a management controller 112 communicatively coupled to processor 103, a switch 114 communicatively coupled to processor 103, and a connector 116 communicatively coupled to switch 114.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface. Active portions of operating system 106 may be transferred to memory 104 for execution by processor 103. Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be stored on a read-only memory of information handling system 102 and which may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Management controller 112 may be configured to provide out-of-band management facilities for management of information handling system 102. Such management may be made by management controller 112 even if information handling system 102 is powered off or powered to a standby state. Management controller 112 may include a processor 113, memory, an out-of-band network interface separate from and physically isolated from an in-band network interface, and a sideband interface. In certain embodiments, management controller 112 may include or may be an integral part of a baseboard management controller (BMC), a remote access controller (e.g., a Dell Remote Access Controller of Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in computer-readable media of information handling system 102 or management controller 112. As shown in FIG. 1, processor 113 may be communicatively coupled to processor 103. Such coupling may be via a Universal Serial Bus (USB), System Management Bus (SMBus), general purpose input/output (GPIO) channel and/or one or more other communications channels.

Switch 114 may comprise any system, device, or apparatus for routing communications between processor 103 and one or more other information handling resources (e.g., device 136). In some embodiments, switch 114 may comprise a Peripheral Component Interconnect Enhanced (PCIe) switch For the purposes of clarity and exposition, only a single destination (i.e., device 136) of the routing capability of switch 114 is shown, and it is understood that information handling system 102 may have a plurality of destinations coupled to switch 114 which may comprise other destinations for communications with processor 103.

Connector 116 may comprise any system, device, or apparatus configured to serve as a cable interface for cable 120 to communicate data between switch 114 and cable 120 (e.g., via PCIe). Accordingly, connector 116 may comprise a suitable connector or receptacle for receiving corresponding connector 118 of cable 120.

A cable 120 may include any suitable assembly of two or more electrically-conductive wires running side by side to carry one or more signals between information handling resources. In some embodiments, cable 120 may comprise a self-describing cable, and thus may include field-replaceable unit (FRU) 124 or another memory device configured to store information describing parameters of cable 120 (e.g., cable type, connector type, impedance, length, part number, etc.) relevant to establishment of a communications link comprising cable 120. Connector 118 may comprise any system, device, or apparatus configured to terminate cable 120 and communicatively couple cable 120 to connector 116. Likewise, connector 122 may comprise any system, device, or apparatus configured to terminate cable 120 and communicatively couple cable 120 to connector 126 of mezzanine card 128. Examples of self-describing cables that may be used to implement cable 120 are described in U.S. application Ser. No. 17/124,774, filed Dec. 17, 2020, which is incorporated by reference herein in its entirety.

Mezzanine card 128 may comprise a printed circuit board configured to receive a multitude of signal lines (e.g., bused signal lines) via one or more connectors (e.g., connector 126) and distribute such signal lines via dedicated connectors (e.g., connector 130 which may be implemented as a receptacle connector) mounted on mezzanine card 128 for receiving one or more devices (e.g., device 136). In some embodiments, mezzanine card 128 may be also be referred to as a paddle card, riser card, and/or backplane.

As shown in FIG. 1, mezzanine card 128 may include a FRU 132 or other memory device configured to store information describing parameters of mezzanine card 128 (e.g., communications bandwidth, connector types, impedances, part number, serial number, etc.).

Device 136 may include any suitable system, device, or apparatus configured to perform a specific functionality. For example, in some embodiments, device 136 may comprise a network interface card configured to communicate via a network with one or more other information handling systems. As another example, in some embodiments, device 136 may comprise a storage device configured to store data and/or instructions (e.g., a Non-Volatile Memory Enhanced or "NVMe" device). In these and other embodiments, device 136 may communicate with processor 103 via PCIe. As shown in FIG. 1, device 136 may include a connector 134 (e.g., an edge connector) for coupling device 136 to mezzanine card 128 (e.g., via a corresponding receptacle connector, such as connector 130).

As also depicted in FIG. 1, mezzanine card 128 may include a FRU 138 or other memory device configured to store information describing parameters of device 136 (e.g., communications bandwidth, connector types, impedances, part number, serial number, etc.).

In operation, management controller 112 may be configured to retrieve via a sideband interface of management controller 112 the information stored in FRUs 124, 132, and 138, and extract from such information properties relevant to a communications link including cable 120, mezzanine card 128, and device 136. From such parameters, management controller 112 may further be able to determine parameters associated with the communications link for purposes of determining link health, setting speed limits of communications through the link, and/or tuning of the communications link.

FIG. 2 illustrates a flowchart of an example method 200 for determining parameters of a communications link in an information handling system, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, management controller 112 may retrieve signal integrity critical parameters for portions of a communications link between processor 103 and device 136 that exist within motherboard 101 (e.g., processor 103, switch 114, connector 116, and motherboard 101 itself). Such information may be retrieved from a descriptor file (e.g., stored in a FRU or other memory integral to motherboard 101) that includes signal integrity critical parameters associated with motherboard 101 including without limitation, for example, printed circuit board material, copper foil type, impedances, bus channel loss, bus length, connector types, etc.

At step 204, management controller 112 may retrieve signal integrity critical parameters for portions of the communications link between processor 103 and device 136 that exist within mezzanine card 128, device 136, and/or other circuits within the communications link outside of motherboard 101. For example, management controller 112 may retrieve such critical parameters via a sideband interface from FRUs 132, 138, and/or similar static memories of other circuits within the communications link path. Such information may include any relevant parameters associated with mezzanine card 128, device 136, and/or other circuits, including without limitation, for example, printed circuit board material, copper foil type, impedances, bus channel loss, bus length, connector types, etc.

At step 206, management controller 112 may retrieve signal integrity critical parameters for portions of the communications link between processor 103 and device 136 that exist within the cable assembly of cable 120 and its connectors 118 and 122. For example, management controller 112 may retrieve such critical parameters via a sideband interface from FRU 124. Such information may include any relevant parameters associated with cable 120, including without limitation, for example, length, impedances, channel loss, connector types, etc.

At step 208, management controller 112 may communicate the signal integrity critical parameters collected in steps 202-206 above to BIOS 105 executing on processor 103 and/or to other information handling resources of information handling system 102.

At step 210, management controller 112, BIOS 105, and/or other information handling resources may, based on the aggregate signal integrity critical parameters collected in steps 202-206, perform one or more actions, including without limitation ensuring a valid or validated configuration for the communications link, tuning the communications link, relaying preset hints to components within the communications link, limiting a trained bus speed, and performing authentic cable attestation.

As a specific example, in these and other embodiments, management controller 112 and/or BIOS 105 may consume the end-to-end topology of a communications link and the aggregate signal integrity critical parameters collected in steps 202-206. Management controller 112 and/or BIOS 105 BMC may then calculate, if channel elements of a communications channel are present, the maximum suggested speed for such channel including sufficient margins. Further, using end-to-end topology and aggregate signal integrity critical parameters, BIOS 105 may, during link purposing of fabric types, widths, etc., set a maximum advertised training speed in the associated upstream port of the given channel.

As a further specific example, management controller 112 and/or BIOS 105 may provide PCIe transmit hints to the root complex. Currently, many processors use the same preset hint for all channels. While using the same hint for all channels avoids the risk of picking a bad hint, at the same time, using the same hint may also negatively affect efficiency as a processor may never pick the optimal hint. However, using the aggregate signal integrity critical parameters, processor 103 may pick the appropriate hint based on the channel description.

As another specific example, BIOS 105 may relay the maximum supportable speed for each communications link to users based on the aggregate self-describing attributes for all channels.

Although FIG. 2 discloses a particular number of steps to be taken with respect to method 200, it may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor;
   a device communicatively coupled to a processor via a communications link including a cable assembly; and
   a management controller communicatively coupled to the processor and communicatively coupled to the device and the cable assembly via a sideband interface, and configured to:
   retrieve, via the sideband interface, self-describing signal integrity critical parameters from non-transitory computer-readable media integral to the device;
   retrieve, via the sideband interface, self-describing signal integrity critical parameters from non-transitory computer-readable media integral to the cable assembly;
   combine the self-describing signal integrity critical parameters from non-transitory computer-readable media integral to the device and the self-describing signal integrity critical parameters from non-transitory computer-readable media integral to the cable assembly into aggregate signal integrity critical parameters; and
   perform an action relevant to the communications link based on the aggregate signal integrity critical parameters.

2. The information handling system of claim 1, wherein the management controller is further configured to:
   retrieve, via the sideband interface, self-describing signal integrity critical parameters from non-transitory computer-readable media integral to information handling resources making up the communications link other than the cable assembly and the device; and
   combine the self-describing signal integrity critical parameters from non-transitory computer-readable media integral to the device, the self-describing signal integrity critical parameters from non-transitory computer-readable media integral to the cable assembly, and the signal integrity critical parameters from non-transitory computer-readable media integral to information handling resources making up the communications link other than the cable assembly and the device into the aggregate signal integrity critical parameters.

3. The information handling system of claim 2, wherein the information handling resources making up the communications link other than the cable assembly and the device include at least one of a motherboard comprising the processor or a circuit interfaced between the processor and the device.

4. The information handling system of claim 1, wherein performing the action comprises communicating the aggregate signal integrity critical parameters to a basic input/output system (BIOS) of the information handling system.

5. The information handling system of claim 4, further comprising the BIOS, and wherein the BIOS is configured to:
   receive the aggregate signal integrity critical parameters from the management controller; and
   perform a second action relevant to the communications link based on the aggregate signal integrity critical parameters.

6. The information handling system of claim 5, wherein performing the second action comprises one or more of: ensuring a valid or validated configuration for the communications link, tuning the communications link, relaying preset hints to components within the communications link, limiting a speed of the communications link, and performing authentic cable attestation of the cable assembly.

7. The information handling system of claim 1, wherein performing the action comprises one or more of: ensuring a valid or validated configuration for the communications link, tuning the communications link, relaying preset hints to components within the communications link, limiting a speed of the communications link, and performing authentic cable attestation of the cable assembly.

8. A method comprising, in an information handling system comprising a processor and a device communicatively coupled to a processor via a communications link including a cable assembly:
   retrieving, via a sideband interface, self-describing signal integrity critical parameters from non-transitory computer-readable media integral to the device;
   retrieving, via the sideband interface, self-describing signal integrity critical parameters from non-transitory computer-readable media integral to the cable assembly;
   combining the self-describing signal integrity critical parameters from non-transitory computer-readable media integral to the device and the self-describing signal integrity critical parameters from non-transitory computer-readable media integral to the cable assembly into aggregate signal integrity critical parameters; and
   performing an action relevant to the communications link based on the aggregate signal integrity critical parameters.

9. The method of claim 8, further comprising:
   retrieving, via the sideband interface, self-describing signal integrity critical parameters from non-transitory computer-readable media integral to information handling resources making up the communications link other than the cable assembly and the device; and
   combining the self-describing signal integrity critical parameters from non-transitory computer-readable media integral to the device, the self-describing signal integrity critical parameters from non-transitory computer-readable media integral to the cable assembly, and the signal integrity critical parameters from non-transitory computer-readable media integral to information handling resources making up the communications link other than the cable assembly and the device into the aggregate signal integrity critical parameters.

10. The method of claim 9, wherein the information handling resources making up the communications link other than the cable assembly and the device include at least one of a motherboard comprising the processor or a circuit interfaced between the processor and the device.

11. The method of claim 8, wherein performing the action comprises communicating the aggregate signal integrity critical parameters to a basic input/output system (BIOS) of the information handling system.

12. The method of claim 11, further comprising:
receiving by the BIOS the aggregate signal integrity critical parameters from the management controller; and
performing by the BIOS a second action relevant to the communications link based on the aggregate signal integrity critical parameters.

13. The method of claim 12, wherein performing the second action comprises one or more of: ensuring a valid or validated configuration for the communications link, tuning the communications link, relaying preset hints to components within the communications link, limiting a speed of the communications link, and performing authentic cable attestation of the cable assembly.

14. The method of claim 8, wherein performing the action comprises one or more of: ensuring a valid or validated configuration for the communications link, tuning the communications link, relaying preset hints to components within the communications link, limiting a speed of the communications link, and performing authentic cable attestation of the cable assembly.

15. An article of manufacture comprising:
a non-transitory computer-readable medium; and
computer-executable instructions carried on the computer-readable medium, the instructions readable by a processing device, the instructions, when read and executed, for causing the processing device to, in an information handling system comprising a processor and a device communicatively coupled to the processor via a communications link including a cable assembly:
retrieve, via the sideband interface, self-describing signal integrity critical parameters from non-transitory computer-readable media integral to the device;
retrieve, via the sideband interface, self-describing signal integrity critical parameters from non-transitory computer-readable media integral to the cable assembly;
combine the self-describing signal integrity critical parameters from non-transitory computer-readable media integral to the device and the self-describing signal integrity critical parameters from non-transitory computer-readable media integral to the cable assembly into aggregate signal integrity critical parameters; and
perform an action relevant to the communications link based on the aggregate signal integrity critical parameters.

16. The article of claim 15, the instructions for further causing the processing device to:
retrieve, via the sideband interface, self-describing signal integrity critical parameters from non-transitory computer-readable media integral to information handling resources making up the communications link other than the cable assembly and the device; and
combine the self-describing signal integrity critical parameters from non-transitory computer-readable media integral to the device, the self-describing signal integrity critical parameters from non-transitory computer-readable media integral to the cable assembly, and the signal integrity critical parameters from non-transitory computer-readable media integral to information handling resources making up the communications link other than the cable assembly and the device into the aggregate signal integrity critical parameters.

17. The article of claim 16, wherein the information handling resources making up the communications link other than the cable assembly and the device include at least one of a motherboard comprising the processor or a circuit interfaced between the processor and the device.

18. The article of claim 15, wherein performing the action comprises communicating the aggregate signal integrity critical parameters to a basic input/output system (BIOS) of the information handling system.

19. The article of claim 18, wherein the BIOS is configured to:
receive the aggregate signal integrity critical parameters from the management controller; and
perform a second action relevant to the communications link based on the aggregate signal integrity critical parameters.

20. The article of claim 19, wherein performing the second action comprises one or more of: ensuring a valid or validated configuration for the communications link, tuning the communications link, relaying preset hints to components within the communications link, limiting a speed of the communications link, and performing authentic cable attestation of the cable assembly.

21. The article of claim 15, wherein performing the action comprises one or more of: ensuring a valid or validated configuration for the communications link, tuning the communications link, relaying preset hints to components within the communications link, limiting a speed of the communications link, and performing authentic cable attestation of the cable assembly.

* * * * *